United States Patent Office 3,192,939
Patented July 6, 1965

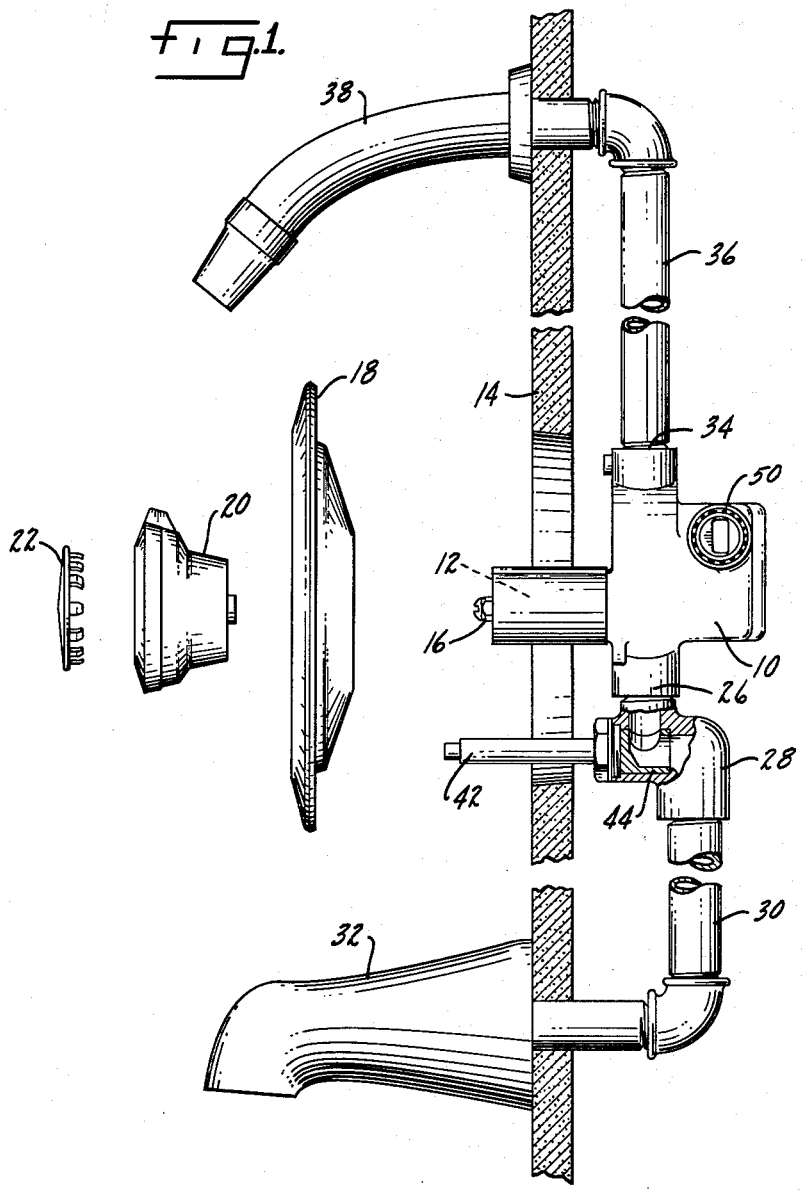

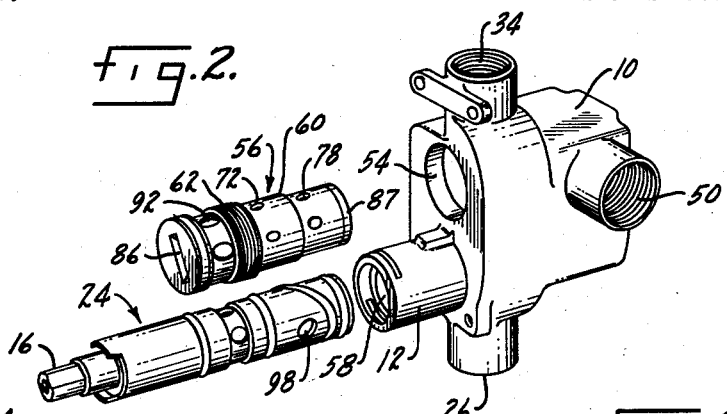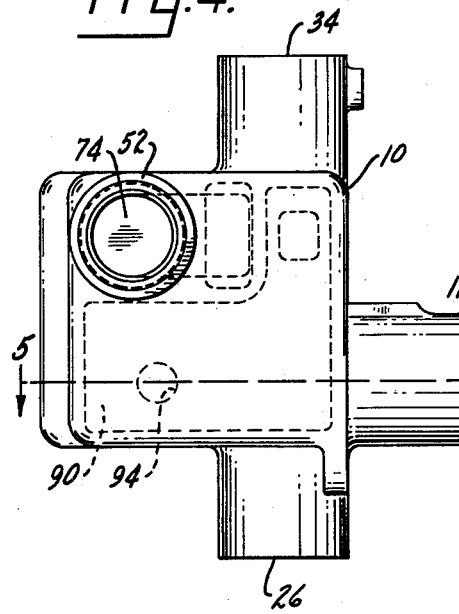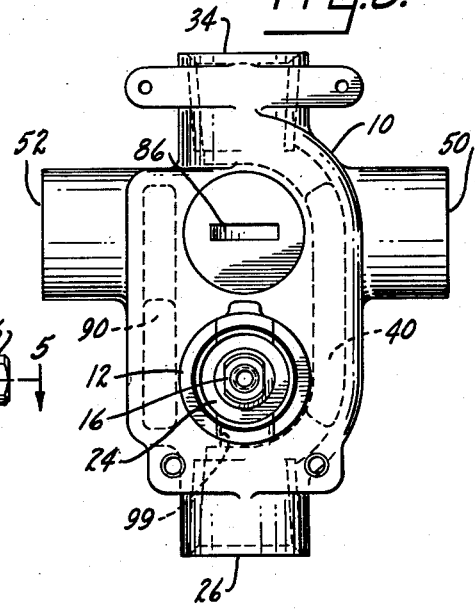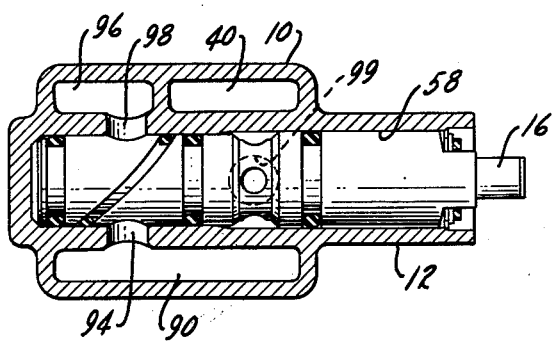

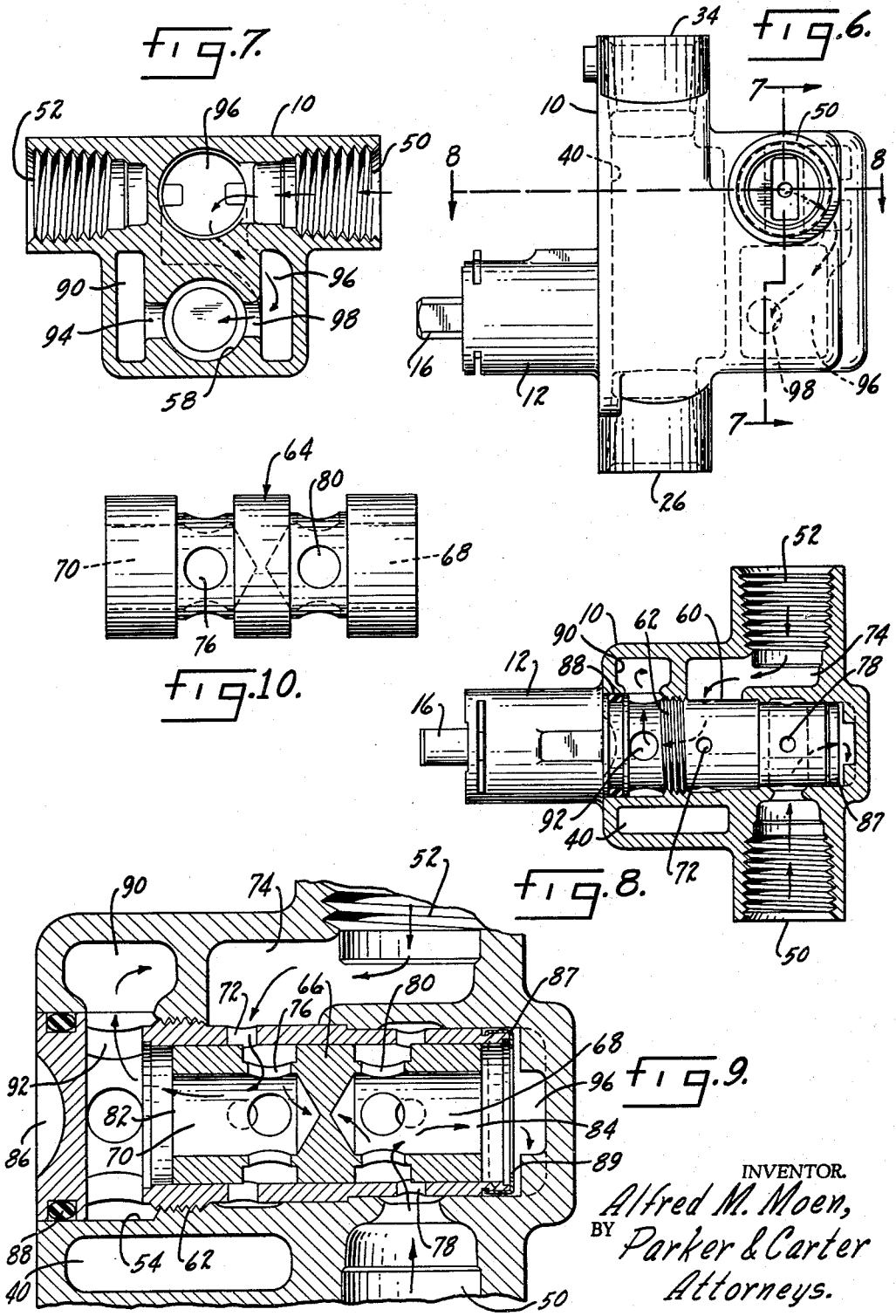

3,192,939
ANTI-SCALD VALVE ASSEMBLY
Alfred M. Moen, 25 Lakeview Drive, Grafton, Ohio
Filed Jan. 15, 1962, Ser. No. 166,346
6 Claims. (Cl. 137—100)

This invention relates to an anti-scald valve assembly and has for a primary object the provision of a combination anti-scald valve and mixing valve assembly.

Another object is an improved type of anti-scald device which provides a balanced supply of hot and cold water, regardless of pressure changes in the hot and cold water conduits feeding the faucets.

Another object is an assembly combining an anti-scald device, mixing valve and diverter.

Another object is an improved housing suitable for mounting an anti-scald device cartridge and a mixing valve cartridge.

Other objects will appear in the ensuing specification, drawings and claims.

The invention is illustrated diagrammatically in the following drawings wherein:

FIGURE 1 is a front view, partially exploded, and with portions broken away for clarity, illustrating a faucet and the anti-scald device and mixing valve assembly of this invention, FIGURE 2 is a perspective of the mixing valve and anti-scald device housing, with the valve cartridge and anti-scald device cartridge positioned for insertion therein, FIGURE 3 is a front plan view of the housing illustrated in FIGURE 2, FIGURE 4 is a side view of the housing from the left side of FIGURE 3, FIGURE 5 is a section along plane 5—5 of FIGURE 4, FIGURE 6 is a side view of the housing from the right side of FIGURE 3, FIGURE 7 is a section along plane 7—7 of FIGURE 6, FIGURE 8 is a section along plane 8—8 of FIGURE 6, FIGURE 9 is an enlarged axial section illustrating the anti-scald device, and FIGURE 10 is a plan view of the valve member movable within the anti-scald device housing.

In FIGURE 1 a housing 10 may have a cylindrical portion 12 extending outwardly through the wall 14 of a combination tub and shower. Within the portion 12 is a mixing valve, as described hereinafter, and mounted in the mixing valve is a stem 16. Mounted on the stem 16 is an escutcheon plate 18, a turning knob 20, and a cover plate 22. The mixing valve is fixed within the housing portion 12 and is adapted to mix hot and cold water and to vary the volume by rotating and reciprocating the turning knob 20. The details of the mixing valve cartridge, which is illustrated generally at 24 in FIGURE 2, are not important to this invention and are explained in detail in my co-pending application Serial No. 6,452, filed February 3, 1960, now Patent 3,103,231.

At the bottom of the housing 10 is an outlet port 26 opening into an elbow or the like 28, the elbow in turn being connected to a conduit 30 which opens into a conventional spigot 32 positioned at the head of the bathtub. The top of the housing 10 may have an outlet 34 which opens into a conduit 36 and then to a conventional shower head or the like 38. As shown in FIGURE 3, there is a generally peripheral passage 40 connecting the outlet ports 26 and 34.

The elbow 28 may mount a stem 42 which is connected within the elbow to a rotatable sleeve 44. The sleeve 44 rotates within the generally horizontal elbow portion and has an opening which as shown in FIGURE 1 is in alignment with the outlet port 26. By turning the stem 42 the sleeve 44 will be rotated to close outlet port 26 and water will thereby be diverted up through bypass passage 40 and to the shower head.

In operation, rotation and reciprocation of the stem 16 will change the water temperature and the water volume. Rotation of the stem 42 is effective to direct water either to the tub outlet 32 or to the shower head 38.

The housing 10 may have a hot water inlet 50 and a cold water inlet 52, these inlets preferably being at opposite sides of the housing. The housing 10 may have a first chamber 54 which may be generally in alignment with or in the same plane as the hot and cold water inlets. Positioned within the chamber 54 is an anti-scald device 56 which is effective to direct equal supplies of hot and cold water to the mixing valve regardless of changes in the water pressure in either or the hot or cold water lines. Directly below the first chamber 54 is a second chamber 58 which is adapted to mount the mixing valve 24.

The anti-scald device is illustrated in detail in FIGURES 9 and 10 and may include an outer housing 60, generally cylindrical in form, and exteriorly threaded, as at 62. The threads 62 are used to fix the housing 60 within the general housing 10. Slidable within the housing 60 is a valve member 64, also generally cylindrical in form and including a central plug 66 which separates two hollow portions 68 and 70. The housing 60 may have a plurality of cold water inlet ports 72 in communication with the cold water inlet 52 through a passage 74. The slidable valve member 64 also has a plurality of cold water inlet ports 76 generally in alignment with the ports 72, but preferably closer to the center of the slideable valve member 64 and to the plug 66. In this way, the incoming cold water will be directed generally toward the center of the slideable valve member or toward the plug 66. The housing 60 may also include a plurality of hot water inlet ports 78 in communication with the hot water inlet 50. Hot water inlet ports 80 are formed in the slidable valve member 64 and again are closer to the center of the slideable valve member than the ports 78 so that the hot water will be directed generally toward the plug 66.

In operation, normally the pressure in the hot and cold water pipes will be the same and the slideable valve member will stay generally in the center of the housing 60. Generally equal amounts of hot and cold water will be directed through the cold water outlet 82 and the hot water outlet 84 at opposite ends of valve member 64. If there should be a sudden change in the pressure in the cold water pipe, for example by a toilet being flushed, without a device such as that shown herein, the volume of hot water would substantially exceed the volume of cold and a person taking a shower or bath may be scalded. However, with the device shown herein if the pressure in the hot water pipe suddenly exceeds the pressure in the cold water pipe, the volume of hot water entering the hollow portion 68 will cause the slideable valve member to move toward the left, as shown in FIGURE 9, to further open the cold water ports and to partially close the hot water ports. The valve member 64 will continue to move until the pressure in the two hollow portions 68 and 70 is substantially equal. This is a balancing type of valve and it will move until the pressure directed at opposite sides of the plug 66 equalizes and hence holds the valve in a stationary position. As soon as the pressure equalizes, the volume of hot and cold water directed through the outlets 82 and 84 will be equal.

The housing 60 may further include a screw-driver slot 86, at the left-hand end as shown in FIGURE 9, so that the cartridge forming the anti-scald device may be suitably secured within the housing 10.

Once the cartridge 56 is positioned within the chamber 54, the only movable part of the anti-scald device is the slideable valve element 64. A suitable O-ring 88 or the like may be used to seal the outward end of the housing 60. The inward end of the anti-scald device may be closed by a cap 87 having a central opening 89. The cap 87 holds the member 64 in the housing 60 and so holds the cartridge in one piece.

The cold water outlet 82 is in communication with a passage 90 through suitable ports 92. The passage 90 is generally L-shaped and leads down to one side of the mixing valve cartridge 24. The passage 90 may open into an inlet port 94 which is in communication with the mixing valve chamber 58. In like manner, the hot water outlet 84 opens into a passage 96 which is in communication with the mixing valve chamber 58 through a hot water inlet port 98. In this way, hot and cold water are directed to the mixing valve cartridge. As stated before the volume and temperature of the water is regulated by this cartridge and the water is then directed from the cartridge outlet 99 through the housing outlet 26 to the tub or, in the alternative, through the passage 40 and then to the shower head 38.

The use, operation and function of the invention are as follows:

This invention relates to a combination mixing valve and anti-scald device housing, as well as to the details of the anti-scalding device itself. It is particularly advantageous to provide a housing of the type described in which chambers are provided for mixing valve and anti-scald device cartridges. In many of the presently-used faucet and anti-scald device combinations, when some portions of either the valve for mixing the hot and cold water or the anti-scald device wears out, it is necessary to replace the whole assembly. However, with the present invention, if either the anti-scald device or the mixing valve malfunctions or wears out, it is only necessary to replace one or the other of the cartridges. It is not necessary for the plumber to remove the entire housing and thus perform a major job on the plumbing. The present invention is a distinct advantage in that the cartridges and housing provide for easy replacement of worn parts.

The details of the housing are important in that it provides a compact and efficient mounting for the two cartridges mentioned above. The hot and cold water inlets may be on opposite sides of the housing and may direct water first through the anti-scald device and then through generally peripheral passages to the mixing valve. From the mixing valve the water can either go down to the tub or it can go up through the bypass passage to the shower head. Whether or not the water goes to the tub or to the shower head depends upon whether or not the diverter arrangement, positioned directly below the valve cartridge, is operated.

The details of the anti-scald device are important. A spool valve is slidably positioned in a housing in such a manner that when the water pressure from both the hot and cold water inlets is equal, the spool valve will remain generally in the center of its somewhat cylindrical housing. Water pressure on opposite sides of a central plug in the spool valve holds the valve stationary. If, however, the pressure in either the hot or cold water conduits should suddenly decrease, the spool valve will be moved, automatically by water pressure, to a position such that the hot and cold water entering the valve are again at generally the same pressure. In this way the water delivered to the mixing valve always has equal parts of hot and cold, regardless of changes in conduit water pressure.

Whereas the preferred form of the invention has been shown and described herein, it should be realized that there are many modifications, substitutions and alterations thereto within the scope of the following claims.

I claim:

1. In combination, a housing, a chamber in the housing, hot and cold water inlets in the housing in communication with the chamber, hot and cold water outlets at opposite ends of the chamber, an anti-scald device in the chamber effective to maintain a balanced supply of hot and cold water to the hot and cold water outlets regardless of changes in the hot and cold water pressure at the inlets, a second chamber in the housing, passages, respectively, from said hot and cold water outlets in the first chamber to the second chamber, said passages opening into said second chamber at opposite sides thereof, a mixing valve in said second chamber effective to mix hot and cold water, and an outlet in said housing in communication with said second chamber to receive water from said mixing valve.

2. The structure of claim 1 further characterized in that said first and second chambers lie generally in the same plane, one above the other.

3. The structure of claim 2 further characterized in that said hot and cold water inlets are generally on opposite sides of said housing and generally in horizontal alignment with each other and with said anti-scald device.

4. The structure of claim 1 further characterized by a second outlet in said housing for receiving water from said mixing valve, and a bypass connecting the first and second outlets for receiving water from said mixing valve, said second outlet being above said first outlet and above said mixing valve and normally not receiving water from said mixing valve.

5. The structure of claim 4 further characterized by and including valve means for closing said first mixing valve outlet and to thereby divert water through said bypass passage to said second outlet.

6. An anti-scald device suitable for use with faucets having hot and cold water inlets including a hollow outer housing adapted to be fixed in position relative to the faucet hot and cold water inlets, a slideable valve member in said housing, said valve member having generally equally sized hollow portions separated by a generally central plug, opposite ends of said valve member and housing being open to form generally equally sized hot and cold water outlet ports, hot and cold water inlet ports in said housing, at least one hot water inlet port in said valve member in communication with a hollow portion on one side of said plug, at least one cold water inlet port in said valve member in communication with a hollow portion on the other side of said plug, said valve member hot and cold water inlet ports being generally equally sized, the hot water inlet ports in the housing being in communication with the hollow portion on one side of said plug through the hot water inlet port in said valve member, the cold water inlet ports in said housing being in communication with the hollow portion on the other side of said plug through the cold water inlet port in said valve member, the hot and cold water inlet ports in the housing being axially spaced apart a distance slightly greater than the axial spacing of the hot and cold water inlet ports in the valve member, with the hot and cold water inlet ports in the housing at least partially overlapping the hot and cold water inlet ports in the valve member when the plug is generally centrally located between the hot and cold water inlet ports in the housing, a change in water pressure in either the hot or cold water inlets being effective to slidably move said valve member within said housing and to change the degree of overlapping of the hot and cold water inlet ports in the housing with the hot and cold water inlet ports in the valve member such that generally equal amounts of hot and cold water are directed through the outlets in the housing.

References Cited by the Examiner

UNITED STATES PATENTS

| | | | |
|---|---|---|---|
| 2,800,137 | 7/57 | Fraser | 137—100 |
| 2,987,070 | 6/61 | Fraser | 137—100 |
| 2,990,840 | 7/61 | Snow | 137—630.14 XR |

FOREIGN PATENTS 1,259,804  3/61  France.

ISADOR WEIL, *Primary Examiner.*

MARTIN P. SCHWADRON, *Examiner.*